United States Patent [19]

Goel

[11] Patent Number: 4,665,230

[45] Date of Patent: May 12, 1987

[54] REACTION PRODUCTS OF POLYOLS WITH BICYCLIC AMIDE ACETALS AND THEIR APPLICATION IN POLYURETHANE POLYMERS

[75] Inventor: Anil B. Goel, Worthington, Ohio

[73] Assignee: Ashland Oil, Inc., Ashland, Ky.

[21] Appl. No.: 741,999

[22] Filed: Jun. 6, 1985

[51] Int. Cl.[4] ............................................. C07C 103/38
[52] U.S. Cl. ..................................... 564/224; 521/115
[58] Field of Search ......................................... 564/224

[56] References Cited

U.S. PATENT DOCUMENTS 4,529,822  7/1985  Duranleau et al. ................. 564/132
4,605,746  8/1986  Goel .................................... 548/218

*Primary Examiner*—Maurice J. Welsh
*Attorney, Agent, or Firm*—John F. Jones

[57] ABSTRACT

A process for preparing a poly(alkylene amido-ether) polyols by reaction of a bicyclic amide acetal with a polyol at a temperature in the range of from 140°–240° C. and the use of these poly(alkylene amido-ether) polyols in the formation of polyurethanes are described.

12 Claims, No Drawings

REACTION PRODUCTS OF POLYOLS WITH BICYCLIC AMIDE ACETALS AND THEIR APPLICATION IN POLYURETHANE POLYMERS

This invention relates to a process for reacting bicyclic amide acetals with polyols such as ethylene glycol at temperatures in the range of 140°–240° C. to yield new polyols containing amido and ether groups and to the use of these new polyols in polyurethane polymers.

Although bicyclic amide acetals have been found to react with reactive protic reagents such as carboxylic acids and phenol (Synth., 16, 1971), the reactions and the reaction products of bicyclic amide acetals with polyols have not previously been described. Bicyclic amide acetals useful in this invention include those discussed in copending U.S. patent applications Ser. Nos. 641,238 now U.S. Pat. No. 4,605,746 and 641,242, filed on Aug. 16, 1984.

It is an object of this invention to demonstrate for the first time the reaction between polyols and bicyclic amide acetals resulting in the formation of new poly(alkylene amido-ether) polyols. Furthermore, these new polyols have been found to be useful in the formation of new polyurethane polymers by their reaction with polyisocyanates which have utility as adhesives, foams, and in reaction injection molding (RIM) as well as in other urethane polymer applications which are well known to those skilled in the art.

I have discovered that bicyclic amide acetals of Formulas I, II and III react with polyols at temperatures in the range of about 140 degrees C. and above, preferably in the range of from about 150°–230° C. to form poly(alkylene amido-ether) polyols.

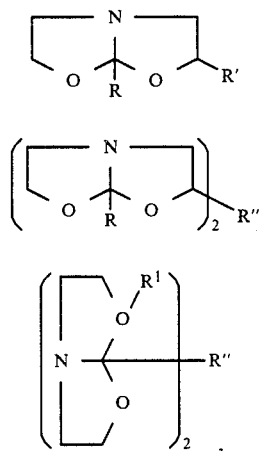

wherein R represents hydrogen, an alkyl group having from 1 to 19 carbon atoms, an aryl group having from 6 to 12 carbon atoms or an alkaryl group having from 7 to 20 carbon atoms, R' represents hydrogen, an alkyl group having from 1 to 10 carbon atoms, an aryl group having from 6 to 12 carbon atoms, an alkaryl group having from 7 to 15 carbon atoms, an alkyl ether group having from 1 to 20 carbon atoms, or an aryl ether group having from 6 to 12 carbon atoms, and R" represents an alkylene group having from 1 to 20 carbon atoms or an alkylene ether group having from 1 to 20 carbon atoms.

The polyols useful in this invention include those having at least two hydroxyl groups per molecule. Specific polyols include alkylene polyols such as butane diol, cyclohexane dimethanol, tripropylene glycol, amide polyols such as amide diols, urethane polyols such as urethane diols, polyether polyols such as poly(tetramethylene ether)diol, poly(propylene ether)-polyols, polyester polyols, and the like.

Polyhydroxy polyethers are suitable polyols for use in this invention and preferably those having at least 2 hydroxyl groups per molecule. Polyhydroxy polyethers can be prepared by polymerization of epoxides such as ethylene oxide, propylene oxide, butylene oxide, tetrahydrofuran, styrene oxide, or epichlorohydrin either on their own or by chemical addition to other materials such as ethylene glycol, propylene glycol, trimethylol propanes and 4,4'-dihydroxy diphenyl propane. Sucrose polyethers also may be used. Polybutadienes having hydroxyl groups as well as other known hydroxyl containing vinyl addition polymerized polymers can be used.

According to the present invention hydroxyl containing polyesters, polythioethers, polyacetals, polycarbonates or polyesteramides of the types known for the formation of polyurethanes may also be used.

Particularly useful polyols for the present invention include ethylene glycol, propylene glycol, trimethylene glycol, triethylene glycol, pentaethylene glycol, polyethylene glycol, 1,4-butanediol, diethylene glycol, dipropylene glycol, 2,2-dimethyl-1,3-propanediol, hexamethylene glycol, 1,4-cyclohexane dimethanol, xylene alcohols, ethyl resorcinol, propyl resorcinol, 2,4-dimethyl resorcinol, 3,6-dimethyl-1,2,4-benzene triol, ethyl pyrogaliol, 2,4-methyl-1,4-dihydroxy naphthalene, 3-methyl-1,4,5-naphthalene triol, dimethylol toluene, dimethylol xylene, bis-hydroxy ethyl or bis-hydroxy propyl ethers of resorcinol, catechol, or hydroquinones, 1,5-dihydroxy naphthalene, 4,4'-isopropylidene-bis-phenol, and the like.

The polyisocyanates useful in the preparation of polyurethanes by reaction with the polyols of this invention include organic isocyanates having at least two isocyanate groups per molecule. The polyisocyanates can be of low, high or intermediate molecular weight and can be any of a wide variety of organic polyisocyanates including ethylene diisocyanate, trimethylene diisocyanate, dodecamethylene diisocyanate, hexamethylene diisocyanate, hexamethylene diisocyanate trimer, tetraethylene diisocyanate, pentamethylene diisocyanate, propylene-1,2-diisocyanate, 2,3-dimethyl tetramethylene diisocyanate, butylene-1,2-diisocyanate, butylene-1,3-diisocyanate, 1,4-diisocyanato cyclohexane, cyclopentene-1,3-diisocyanate, p-phenylene diisocyanate, 1-methyl phenylene-2,4-diisocyanate, naphthalene-1,4-diisocyanate, toluene diisocyanate, diphenyl-4,4'-diisocyanate, benzene-1,2,4-triisocyanate, xylene-1,4-diphenylene methane diisocyanate, 4,4-diphenylene propane diisocyanate, 1,2,3,4-tetraisocyanato butane, butane-1,2,3-triisocyanate, polymethylene polyphenyl isocyanate, and other polyisocyanates having an isocyanate functionality of at least two which are more fully disclosed in U.S. Pat. Nos. 3,350,362 and 3,382,215. Polyisocyanates which are polymeric in nature including isocyanate prepolymers of all types are included in this invention.

In the reaction between the amide acetals and the polyols the amide acetals undergo a ring opening reaction yielding the new poly(alkylene amido-ether)-polyols of molecular weight higher than the starting polyol. The presence of the tertiary amide group and the hydroxy groups in the product (or products) has been confirmed by the presence of infrared bands in the region 1620–40 cm$^{-1}$ (hydroxyl) respectively. The simplest form of the reaction which illustrates the process of this invention insofar as production of the major product is concerned is as follows:

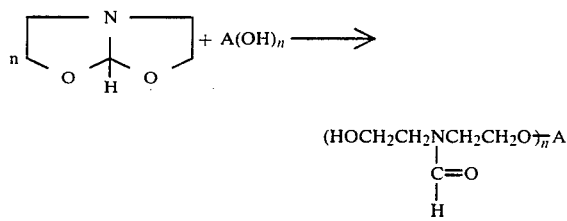

$$(HOCH_2CH_2NCH_2CH_2O)_{\overline{n}}A$$
$$|$$
$$C=O$$
$$|$$
$$H$$

wherein n represents a whole number of at least 2 and A typically can be an alkylene group, such as ethylene, for instance. Because the product of the foregoing reaction also contains hydroxyl groups, it can also react further with additional bicyclic amide acetal to give an amido-ether chain extended polyol product. Although the major products from the reaction of polyols with bicyclic amide acetals appears to be the poly(alkylene amido-ether)polyol, the formation of small amounts of amino-ester group containing polyols has also been observed (infrared analysis showed ester group bands at 1710–1740 cm$^{-1}$).

Polyols of varying molecular weights can be obtained by adjusting the amounts of bicyclic amide acetal used in the reaction. Thus, by reacting a polyol of low molecular weight (e.g. ethylene glycol, diethylene glycol, triethylene glycol, etc.) with a large excess of bicyclic amide acetal results in the formation of high molecular weight poly(alkylene amido-ether)diol. Similarly, the hydrolyzed product of bicyclic amide acetal, i.e. amide diol, can be reacted with a bicyclic amide acetal. Thus, a polyol which can be reacted with the bicyclic amide acetal may contain groups such as ether, thio ether, amide, amine, ester, and the like. The typical polyols used in the reaction are alkylene ether polyols, amide polyols, ester polyols, urea polyols, and the like. The polyols can be diol, triol, tetraol or of higher hydroxy functionality. Reactions of polyols with bicyclic amide acetals can be carried out either in the presence of catalysts such as metal salts or in the absence of any catalyst.

The polyols which result from the process of this invention can be used in the formation of polyurethane polymers which contain also amido-ether groups by reacting them with polyisocyanates.

Tough, rigid or flexible polyurethanes can be obtained depending upon the type and the amounts of the polyols used. Thus, when a triol or tetraol is used with a polyisocyanate, cross-linked thermoset polymers result. Additives such as other known polyols, amines, epoxies, and the like can be used in conjunction with the polyols of this invention in the polyurethane reaction.

The polyols of this invention have been found to be useful compatibilizing agents for poly(terephthalic ester)polyol/fluorocarbon blowing agent mixtures in rigid or semi-rigid polyurethane/polyisocyanurate foam production of the types more fully described in U.S. Pat. Nos. 3,647,759 and 4,237,238.

This invention is further illustrated in the following representative examples.

EXAMPLE 1

To 100 g of triethylene glycol was added 170.8 g of methyl substituted bicyclic amide acetal (Formula I wherein R is methyl and R' is hydrogen) and the reaction mixture was heated under an atmosphere of nitrogen at 165°–170° C. for 5 hours. The resulting solution was subjected to GLC analysis which revealed the complete disappearance of the starting bicyclic amide acetal. Infrared analysis of the product showed strong bands due to tertiary amide groups at 1620–30 cm$^{-1}$, hydroxyl groups at about 3400 cm$^{-1}$ and a weak-to-medium band at 1730 cm$^{-1}$ due to the carboxylate group. The viscous liquid polyol product was found to have a hydroxy number of 325.

EXAMPLE 2

To 32.1 g of trimethylol propane (TMP) was added 38.7 g of the bicyclic amide acetal described in Example 1 and the reaction mixture was heated at 165°–170° C. for 4 hours. The resulting solution was analyzed by GLC which showed the complete disappearance of the bicyclic amide acetal and the formation of a new high boiling product. Infrared analysis of the product showed strong bands caused by the amide group at 1620–30 cm$^{-1}$, bands at 3350–3400 cm$^{-1}$ for hydroxyl groups and weak band at 1730 cm$^{-1}$ due to carboxylate group indicating the product was a polyol having mainly amide groups. The hydroxy number of the product was 473.

EXAMPLE 3

The procedure of Example 1 was followed using 38 g of tripropylene glycol and 28 g of the bicyclic amide acetal. The liquid product obtained after 21 hours of heating the reaction mixture at 165° C. was analyzed by GLC which showed the disappearance of the bicyclic amide acetal and infrared analysis of the product showed strong bands at 1620–28 cm$^{-1}$ (amide group), 3400 cm$^{-1}$ (hydroxyl group), and a weak bank at 1740 cm$^{-1}$ (carboxylate group). The product had a hydroxy number of 360.

EXAMPLE 4

The procedure of Example 1 was repeated using 15 g of triethylene glycol and 42 g of bicyclic amide acetal of Formula I wherein R represents ethyl and R' represents CH$_2$OCH$_2$CH=CH$_2$ and heating the mixture at 165° C. for 7 hours. GLC analysis of the product showed the absence of the starting bicyclic amide acetal and infrared analysis showed bands at 1625 cm$^{-1}$ (amide groups), 3400 cm$^{-1}$ (hydroxyl groups), and 1735 cm$^{-1}$ (ester groups). The product has a hydroxyl number of 201.

EXAMPLE 5

To 25 g of the bicyclic amide acetal of Example 1 was added 1.5 g of water and the reaction mixture was stirred at room temperature for 15 minutes. The GLC analysis of the product showed the presence of 55% unreacted bicyclic amide acetal and 45% hydrolyzed bicyclic amide acetal (mainly amide diol). The mixture was then heated at 160°–165° C. for 2 hours and was then analyzed by GLC which showed the complete disappearance of the bicyclic amide acetal. The infrared spectrum of the product showed strong bands due to amide groups (1620–1630 cm$^{-1}$), hydroxyl groups (3350–3450 cm$^{-1}$) and a weak band due to carboxylate groups (1740 cm$^{-1}$), indicating the products to be mainly the amide group containing polyol. The hydroxyl number of the product was 374.

EXAMPLE 6

The procedure of Example 5 was followed using 25 g of the bicyclic amide acetal and 0.5 g of water. The mixture was heated for 11 hours at 160° C. The highly viscous liquid had a hydroxy number of 246.

EXAMPLE 7

This experiment demonstrates that the polyol obtained in Example 2 can be used to prepare polyurethane polymers. The polyol of Example 2 (16.8 g) and tripropylene glycol (16.1 g) were mixed and degassed on a rotary evaporator under reduced pressure. The solution was mixed with 58 g of degassed liquid 4,4-methylene bis(phenyl isocyanate) and the mixture was poured into a mold prepared from two parallel silicone mold release coated glass plates separated by ⅛ inch spacers. The mold was placed in an oven set at 100° C. for one hour followed by heating for another hour at 135° C. The solid polymer which resulted was found to have a notched izod impact strength (ASTM D256) of 0.6 foot pounds/inch of notch, a heat distortion temperature (ASTM D648-56) of 102° C., a flexural strength (ASTM D790) of 12,450 psi and a flexural modulus (ASTM D648) of 380,345 psi.

EXAMPLE 8

The procedure of Example 7 was followed using the polyol mixture of Example 2 (9.3 g), tripropylene glycol (27.7 g) and 58 g of the polyisocyanate. The resulting polyurethane was found to have a notched izod impact strength of 0.85 foot pounds/inch of notch and an unnotched izod impact strength of 11 foot pounds/inch.

EXAMPLE 9

The procedure of Example 7 was followed using 23.7 g of the polyol mixture of Example 1, 25.3 g of tripropylene glycol and 59.6 g of polyisocyanate. The final polymer was found to have a notched izod impact strength of 0.4 foot pounds/inch of notch, a flexural strength of 11,895 psi and a flexural modulus of 379,452 psi.

EXAMPLE 10

The procedure of Example 7 was followed using 40 g of the polyol mixture of Example 3, 0.4 g of tertiary amine catalyst, [N,N',N"-tris(dimethylaminopropyl)-hexahydrotriazine] and 50 g of polyisocyanate. The resulting transparent polymer was found to have an izod impact strength of 0.8 foot pounds/inch of notch, a flexural strength of 12,045 psi and a flexural modulus of 372,023 psi.

EXAMPLE 11

The procedure of Example 7 was followed using 11.3 g of the polyol mixture of Example 2, 41.2 g of poly(-terephthalic ester)polyol blended with diethylene glycol of the type described in U.S. Pat. No. 3,647,759 having a hydroxy number of 447 available commercially as Chardol 560 from Chardonol Corp. and 61.4 g of polyisocyanate. The polymer was cured at 110 degrees C. for one hour and was found to have a notched izod impact strength of 0.8 foot pounds/inch of notch, an unnotched izod impact strength of greater than 11 foot pounds/inch, a flexural strength of 16,867 psi and a flexural modulus of 364,039 psi.

EXAMPLE 12

The procedure of Example 7 was followed using 13.6 g of the polyol mixture of Example 1, 52.4 g of poly(-terephthalic ester)polyol blended with diethylene glycol (hydroxy number 350) (Chardol 570) and 60 g of the polyisocyanate. The resulting polymer which was postcured at 110 degrees C. for one hour was found to have a notched izod impact strength of 0.71 foot pounds/inch of notch, an unnotched izod impact strength of 12.5 foot pounds/inch, a flexural strength of 15,336 psi and a flexural modulus of 350,862 psi.

EXAMPLE 13

This experiment demonstrates the usefulness of the polyols of this invention in adhesive formulations. Tripropylene glycol (2 g), the polyol mixture of Example 1 (1.8 g) and the polyisocyanate described in Example 7 (4.4 g) were mixed and the resulting viscous liquid was applied between two one-inch wide unprimed sheet molding compound (SMC) panels with one square inch overlap and the bond thickness was 30 mils. The bond was cured at room temperature for one hour followed by postcuring at 130° C. for one hour. Upon testing the adhesive bond strength in shear tensile strength mode, the SMC substrate failed at about 300 psi and the adhesive bond remained intact. Similarly on cold rolled steel panels the adhesive when cured showed shear strengths in the order of 2,200 psi and above.

EXAMPLE 14

This and the other following examples demonstrate the use of the polyol mixtures of this invention as compatibilizing agents for polyols/fluorocarbon blowing agent mixtures in rigid and semi-rigid polyurethane/isocyanurate foam production. Poly(terephthalic ester)polyol blended with diethylene glycol with hydroxy number 447 described in Example 11 (14 g), the polyol of Example 1 (3 g) and Freon (trichlorofluoromethane) fluorinated hydrocarbon blowing agent (6 g) were mixed to give a homogeneous solution. This solution was kept at room temperature for 15 minutes under a closed system without disturbing and no phase separation was observed in this time. To this mixture was then added 0.3 g of the tertiary amine catalyst described in Example 10, 0.4 g of silicone glycol liquid surfactant and the mixture was mixed rapidly with the addition of 23 g of the polyisocyanate of Example 7. The resulting mixture was observed to have a cream time of 15 seconds, a rise time of 24 seconds and a tack free time of 30 seconds at room temperature. The resulting rigid foam was postcured at 100° C. for 5 minutes and the final rigid foam was found to have a density of 1.8 pounds/cubic foot, a compressive strength in the rise direction of 32 psi and in the width direction of 13 psi.

EXAMPLE 15

This Example is outside the scope of this invention and is included for the purpose of comparison. Poly(-terephthalic ester)polyol blended with diethylene glycol (hydroxyl number 350) (12.14 g) and a 4.6 g of trichlorofluoromethane were mixed rapidly and kept at room temperature. Phase separation occurred within 15 minutes. The mixture was mixed rapidly again and to it was added 0.2 g of the tertiary amine cataylst described in Example 10 and 0.22 g of silicone surfactant. To this was added 12.4 g of polyisocyanate described in Example 7 and the mixture was allowed to foam. The foaming mixture had a cream time of 20 seconds, a rise time of 40 seconds and a tack free time of 45 seconds. The resulting foam was not uniform throughout with viscous pasty solid at the bottom. The upper foamed portion of the foam was found to have a density of 2.29 pounds/cubic foot, a compressive strength of 22 psi in the rise direction and 18 psi in the width direction.

EXAMPLE 16

The procedure of Example 14 was followed using 14 g of poly(terephthalic ester)polyol, 3.1 g of the polyol mixture of Example 2 and 6.3 g of trichlorofluoromethane. The mixture remained homogeneous after 15 minutes standing following mixing. This mixture was then blended with 0.3 g of the tertiary amine catalyst described in Example 10, 0.4 g of silicone surfactant and 24 g of polyisocyanate. The cream time was 16 seconds, the rise time was 25 seconds and the tack free time for the homogeneous foam was 30 seconds. The resulting rigid foam was found to have a density of 1.67 pounds/cubic foot, a compressive strength of 23 psi in the rise direction and 12 psi in the width direction.

EXAMPLE 17

The procedure of Example 14 was followed using 14 g of poly(terephthalic ester)polyol, 3.5 g of the polyol of Example 2, 0.3 g of tertiary amine catalyst, 0.4 g of silicone surfactant, 10 g of talc filler, 5.6 g of trichlorofluoromethane and 26 g of polyisocyanate. The foam had a cream time of 16 seconds, a rise time of 28 seconds and a tack free time of 34 seconds. The resulting foam was postcured for 5 minutes at 100 degrees C. and was found to have a density of 2 pounds/cubic foot and compressive strengths of 35 psi in the rise direction and 15 psi in the width direction. This foam was also found to have better flame retardance (self-extinguishing) over that of Example 16.

I claim:

1. The process for preparing a poly(alkylene amido-ether)polyol comprising reacting a bicyclic amide acetal with a polyol at a temperature in the range of from 140°–240° C.

2. The process of claim 1 wherein the bicyclic amide acetal is one conforming to Formula I, II or III

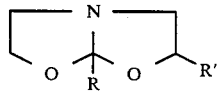

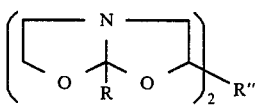

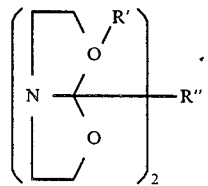

wherein R represents hydrogen, an alkyl group having from 1 to 19 carbon atoms, an aryl group having from 6 to 12 carbon atoms or an alkaryl group having from 7 to 20 carbon atoms, R' represents hydrogen, an alkyl group having from 1 to 10 carbon atoms, an aryl group having from 6 to 12 carbon atoms, an alkaryl group having from 7 to 15 carbon atoms, an alkyl ether group having from 1 to 20 carbon atoms, or an aryl ether group having from 6 to 12 carbon atoms, and R" represents an alkylene group having from 1 to 20 carbon atoms.

3. The process of claim 2 wherein the polyol is one having at least two hydroxyl groups per molecule and being selected from the group consisting of alkylene polyols, amide polyols, urethane polyols, polyether polyols and polyester polyols.

4. The process of claim 3 wherein the bicyclic amide acetal is one of Formula I wherein R is methyl and R' is hydrogen and the polyol is triethylene glycol.

5. The process of claim 3 wherein the bicyclic amide acetal is one of Formula I wherein R is methyl and R' is hydrogen and the polyol is trimethylol propane.

6. The process of claim 3 wherein the bicyclic amide acetal is one of Formula I wherein R is ethyl and R' is CH$_2$OCH$_2$CH=CH$_2$ and the polyol is triethylene glycol.

7. The poly(alkylene amido-ether)polyol composition produced by the reaction of a bicyclic amide acetal with a polyol at a temperature in the range of from 140°–240° C.

8. The composition of claim 7 wherein the bicyclic amide acetal is one having Formula I, II or III

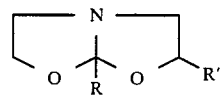

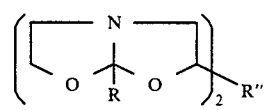

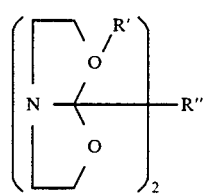

wherein R represents hydrogen, an alkyl group having from 1 to 19 carbon atoms, an aryl group having from 6 to 12 carbon atoms or an alkaryl group having from 7 to 20 carbon atoms, R' represents hydrogen, an alkyl group having from 1 to 10 carbon atoms, an aryl group having from 6 to 12 carbon atoms, an alkaryl group having from 7 to 15 carbon atoms, an alkyl ether group having from 1 to 20 carbon atoms, or an aryl ether group having from 6 to 12 carbon atoms and R" represents an alkylene group having from 1 to 20 carbon atoms or an alkylene ether group having from 1 to 20 carbon atoms.

9. The composition of claim 8 wherein the polyol is one having at least two hydroxyl groups per molecule and being selected from the group consisting of alkylene polyols, amide polyols, urethane polyols, polyether polyols and polyester polyols.

10. The composition of claim 9 wherein the bicyclic amide acetal is one of Formula I wherein R is methyl and R' is hydrogen and the polyol is triethylene glycol.

11. The composition of claim 9 wherein the bicyclic amide acetal is one of Formula I wherein R is methyl and R' is hydrogen and the polyol is trimethylol propane.

12. The composition of claim 9 wherein the bicyclic amide acetal is one of Formula I wherein R is ethyl and R' is $CH_2OCH_2CH=CH_2$ and the polyol is triethylene glycol.

* * * * *